US011031004B2

(12) United States Patent
Tokuchi

(10) Patent No.: US 11,031,004 B2
(45) Date of Patent: Jun. 8, 2021

(54) SYSTEM FOR COMMUNICATING WITH DEVICES AND ORGANISMS

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 144 days.

(21) Appl. No.: 16/121,090

(22) Filed: Sep. 4, 2018

(65) Prior Publication Data

US 2019/0259389 A1 Aug. 22, 2019

(30) Foreign Application Priority Data

Feb. 20, 2018 (JP) .............................. JP2018-027739

(51) Int. Cl.

| | |
|---|---|
| *G10L 15/22* | (2006.01) |
| *G10L 17/06* | (2013.01) |
| *G10L 15/26* | (2006.01) |
| *G06F 3/16* | (2006.01) |
| *G06F 40/20* | (2020.01) |
| *G10L 17/00* | (2013.01) |
| *H04L 29/08* | (2006.01) |

(52) U.S. Cl.
CPC .............. *G10L 15/22* (2013.01); *G06F 3/167* (2013.01); *G06F 40/20* (2020.01); *G10L 15/26* (2013.01); *G10L 17/00* (2013.01); *G10L 17/06* (2013.01); *H04L 67/12* (2013.01)

(58) Field of Classification Search
CPC ....... G10L 17/005; G10L 15/22; G10L 15/24; G10L 15/25; G10L 15/265
See application file for complete search history.

(56) References Cited

U.S. PATENT DOCUMENTS

| | | | |
|---|---|---|---|
| 9,240,904 B2* | 1/2016 | LaFreniere | ............ H04L 51/30 |
| 9,589,565 B2 | 3/2017 | Boies et al. | |
| 9,992,642 B1* | 6/2018 | Rapp | ................... H04W 68/005 |
| 10,051,600 B1* | 8/2018 | Zhong | ..................... H04L 67/12 |
| 10,074,371 B1* | 9/2018 | Wang | ..................... G10L 15/22 |
| 10,204,627 B2* | 2/2019 | Nitz | ......................... G10L 15/30 |
| 10,735,479 B2* | 8/2020 | Padilla | .................. H04L 12/282 |
| 2002/0056000 A1* | 5/2002 | Albert Coussement | ..................... H04L 41/18 709/225 |
| 2002/0069063 A1* | 6/2002 | Buchner | ............... H04L 12/282 704/270 |
| 2003/0193414 A1* | 10/2003 | Jones | ..................... G06Q 10/08 340/994 |
| 2004/0095389 A1 | 5/2004 | Sidner et al. | |
| 2005/0130641 A1* | 6/2005 | Lorraine Scott | .. H04M 1/72563 455/418 |
| 2007/0067161 A1* | 3/2007 | Foster | ..................... G10L 13/00 704/200 |

(Continued)

FOREIGN PATENT DOCUMENTS

| | | |
|---|---|---|
| JP | 2004-234631 A | 8/2004 |
| JP | 2016-524190 A | 8/2016 |

*Primary Examiner* — Shaun Roberts
(74) *Attorney, Agent, or Firm* — Oliff PLC

(57) ABSTRACT

An information processing apparatus includes a reception unit that receives an utterance, an identification unit that identifies a conversation partner, and a determination unit that determines a communication unit for transmitting a meaning of the utterance or an achieving unit for achieving a conversation goal in accordance with the conversation partner.

11 Claims, 4 Drawing Sheets

(56) References Cited

U.S. PATENT DOCUMENTS

| | | | |
|---|---|---|---|
| 2011/0112827 A1* | 5/2011 | Kennewick | G10L 15/18 |
| | | | 704/9 |
| 2012/0016678 A1* | 1/2012 | Gruber | G06F 40/30 |
| | | | 704/275 |
| 2012/0252486 A1* | 10/2012 | Lopez | A01K 15/021 |
| | | | 455/456.1 |
| 2013/0183944 A1* | 7/2013 | Mozer | H04L 12/282 |
| | | | 455/414.1 |
| 2013/0346078 A1* | 12/2013 | Gruenstein | G10L 15/26 |
| | | | 704/235 |
| 2014/0181715 A1* | 6/2014 | Axelrod | G06F 3/0487 |
| | | | 715/771 |
| 2014/0379353 A1* | 12/2014 | Boies | G10L 17/22 |
| | | | 704/275 |
| 2015/0022329 A1* | 1/2015 | Shani | A01K 15/02 |
| | | | 340/286.01 |
| 2015/0181819 A1* | 7/2015 | Celebi | A01G 27/001 |
| | | | 701/2 |
| 2017/0162201 A1 | 6/2017 | Boies et al. | |
| 2017/0223928 A1* | 8/2017 | Davino | A01K 29/00 |
| 2017/0238509 A1* | 8/2017 | Dayal | A61H 3/061 |
| 2018/0040209 A1* | 2/2018 | Lim | H02S 10/12 |
| 2018/0233145 A1* | 8/2018 | Bathiche | G06T 7/248 |
| 2019/0149584 A1* | 5/2019 | DiBello | H04L 12/1822 |

* cited by examiner

FIG. 3

| CONVERSATION PARTNER | POSITIONAL RELATIONSHIP WITH USER | SURROUNDING ENVIRONMENT | COMMUNICATION MEANS | CONVERSATION GOAL (USER'S DESIRE) | ACHIEVING MEANS | DEVICE LANGUAGE |
|---|---|---|---|---|---|---|
| MFP | — | — | NETWORK COMMUNICATION (Wi-Fi) | — | — | C LANGUAGE, PostScript |
| PC | — | — | WIRED LAN | — | — | C LANGUAGE, Java |
| PC | — | — | WIRED LAN | DO ACCOUNTS | REMOTE APP | MS MACRO |
| ROBOT | CLOSE | QUIET | NETWORK COMMUNICATION (BLE) | — | — | C LANGUAGE |
| ROBOT | FAR | — | NETWORK COMMUNICATION (Wi-Fi) | — | — | C LANGUAGE |
| CAR | FAR | — | NETWORK COMMUNICATION (AUTOMOTIVE NAVIGATION SYSTEM) | — | — | C LANGUAGE |
| DOLPHIN | — | SEA | ULTRASONIC WAVES | — | — | — |
| PLANT | CLOSE | NORMAL | SOUND | — | — | — |
| PLANT | FAR | NOISY | SPEAKER | — | — | — |
| PLANT | — | DARK | LIGHT | — | — | — |

SYSTEM FOR COMMUNICATING WITH DEVICES AND ORGANISMS

CROSS-REFERENCE TO RELATED APPLICATIONS

This application is based on and claims priority under 35 USC 119 from Japanese Patent Application No. 2018-027739 filed Feb. 20, 2018.

BACKGROUND

(i) Technical Field

The present disclosure relates to an information processing apparatus and a non-transitory computer readable medium.

(ii) Related Art

During these years, Internet of things (IoT), which is a network of various devices that are connected to the Internet and that communicate information with one another, is rapidly developing. By installing a certain application on an information terminal such as a smartphone, IoT devices can be operated from the information terminal.

A user can instruct an IoT device to perform a process by talking to a smart speaker, that is, by sound. It is now desired to have a conversation with, as with a smart speaker or an IoT device, an organism such as an animal or a plant (See Japanese Unexamined Patent Application Publication No. 2004-234631 and Japanese Unexamined Patent Application Publication (Translation of PCT Application) No. 2016-524190).

SUMMARY

Aspects of non-limiting embodiments of the present disclosure aim to handle an utterance in accordance with an identified conversation partner.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reception unit that receives an utterance, an identification unit that identifies a conversation partner, and a determination unit that determines a communication unit for transmitting a meaning of the utterance or an achieving unit for achieving a conversation goal in accordance with the conversation partner.

BRIEF DESCRIPTION OF THE DRAWINGS

An exemplary embodiment of the present disclosure will be described in detail based on the following figures, wherein:

FIG. 3 is a table illustrating target-related information according to the exemplary embodiment.

DETAILED DESCRIPTION

An exemplary embodiment of the present disclosure will be described hereinafter with reference to the drawings.

A conversation partner of a person can be an animal such as a dog, a bird, or a dolphin, a plant, a computer, or the like as well as another person. If electronic information is given to a computer or speech recognition software installed on a computer interprets a person's utterances, it is possible that a conversation between the person and the computer can be realized. Some pets are able to react to human language but basically do not understand it. It is possible, however, to chase away birds from certain objects (e.g., crops in a farm) in a certain area, for example, by outputting an annoying sound. That is, although it is difficult to communicate a person's meaning, it is possible to convey the person's intention of trying to chase the birds away. In addition, plants are said to grow rapidly in an environment where classical music is played. In other words, by using sound as a medium, we can at least stimulate birds and plants and convey our intentions to them. We could have a conversation with an animal or the like by utilizing communication means that outputs a medium such as sound, light, or ultrasonic waves in accordance with a type of animal.

In the present exemplary embodiment, a conversation partner is identified from a user's utterance, and communication means to be used to convey the user's intention (utterance) is determined in accordance with the conversation partner identified. As a result, the user's intention can be conveyed to the conversation partner using the determined communication means. In addition, when a conversation is intended as an instruction to a conversation partner to perform a certain operation or process, achieving means for achieving this conversation goal can be determined.

The term "conversation" refers to a situation in which two or more parties have a talk. In the present exemplary embodiment, the term "conversation" is interpreted broadly and used not only for a situation in which a two-way exchange of information is made but also for a situation in which a person unilaterally conveys his/her intention to a partner such as an animal.

Figure 1:
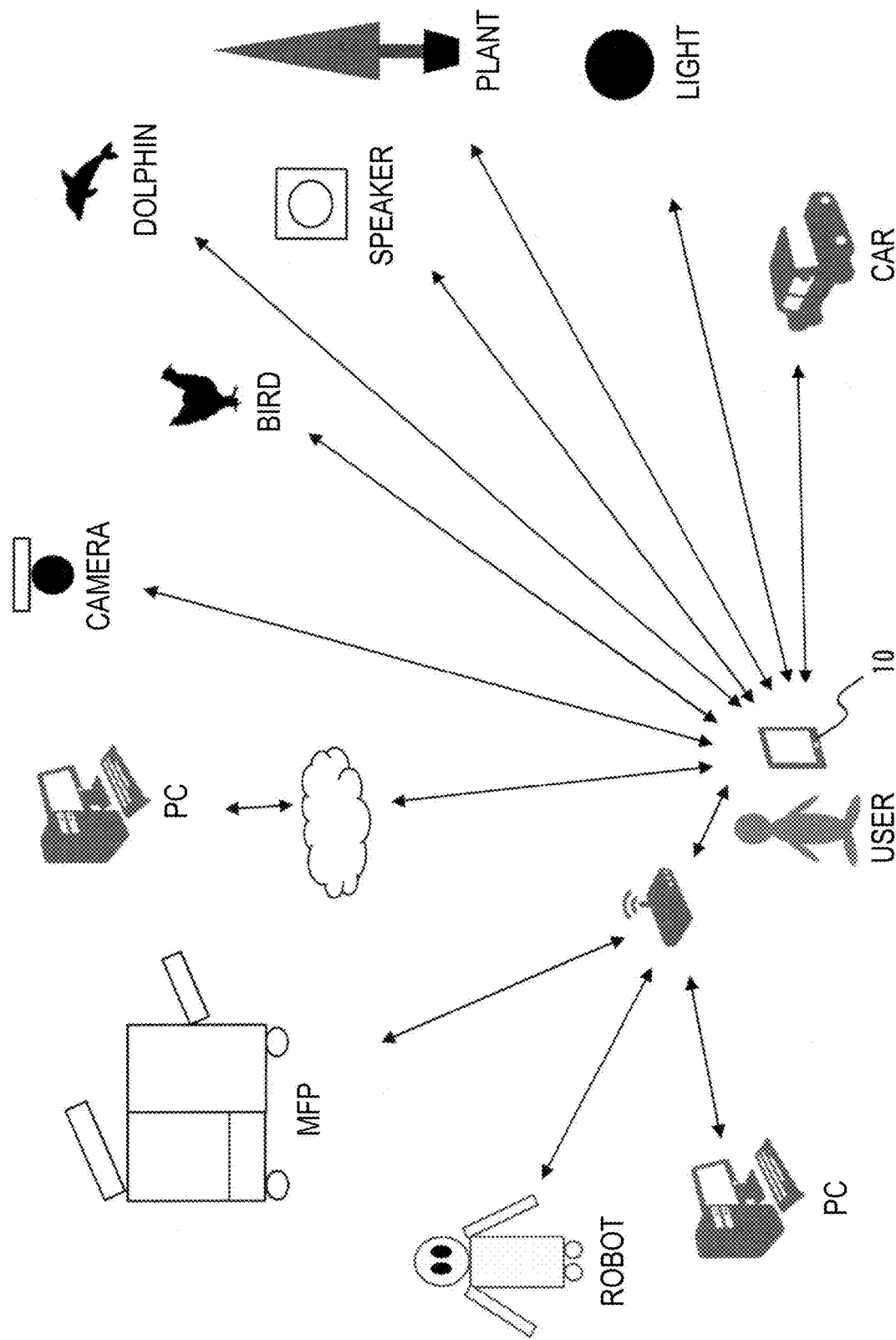
FIG. 1 is a conceptual diagram illustrating a mobile terminal, which is an application of an information processing apparatus in the present disclosure, and possible conversation partners of a user of the mobile terminal.

FIG. 1 is a conceptual diagram illustrating a mobile terminal, which is an application of an information processing apparatus in the present disclosure, and possible conversation partners of a user of the mobile terminal. FIG. 1 illustrates an information processing apparatus 10 used by the user and a personal computer (PC), a multifunction peripheral (MFP), a robot, a camera, a speaker, a light, and a car, which are devices with which the user desires to have a conversation using the information processing apparatus 10. These devices are given electronic information (data signals, control signals, etc.) and become able to have a conversation with the user. The information processing apparatus 10 is capable of communicating with these devices directly or through a communication device or a network. IoT devices are an example of devices communicable with the information processing apparatus 10. The IoT devices include display devices such as projectors and liquid crystal displays, recording devices, playback devices, imaging devices such as cameras, watches, monitoring cameras, automobiles, motorcycles, aircraft (e.g., unmanned aircraft (so-called "drones")), gaming machines, robots (human robots, animal robots, and other robots), various sensors (e.g., temperature sensors, humidity sensors, voltage sensors, current sensors, door sensors, etc.), and home appliances such as refrigerators, rice cookers, microwave ovens, coffeemakers, vacuum cleaners, washing machines, air conditioners, and lighting devices.

FIG. 1 also illustrates a bird, a dolphin, and a plant. These organisms do not basically talk with a person. That is, a person needs to convey his/her intention to these organisms using communication means other than language (a speech sound or written letters). In the present exemplary embodiment, IoT devices, animals, and plants with which the user desires to have a conversation with will be generically referred to as "targets".

"Communication means" hereinafter refers to a medium itself, such as sound or light, or means such as a device that uses a medium to convey an intention to a conversation partner. "Achieving means" hereinafter refers to, when a conversation is intended as an instruction to perform a certain operation or process, means that achieves the instruction or means that causes something else to achieve the instruction. If the user says (utters), "Send the mail to Mr. A", for example, the communication means transmits a meaning of the utterance, "Send the mail to Mr. A", to a conversation partner, and the achieving means actually sends the mail to Mr. A.

The information processing apparatus 10 according to the present exemplary embodiment is one of various devices such as information processing apparatuses including PCs, tablet PCs, smartphones, mobile phones, and smart speakers and IoT devices equipped with information processing apparatuses. A smart speaker is a speaker having an audio assistant function that is usually provided inside a room and that, in response to an audio request from a user, obtains various pieces of information through a network and answers to the user or controls the operation of IoT devices. That is, a smart speaker is a speaker operable with speech sound alone. A smart speaker is also called an "artificial intelligence (AI) speaker".

The information processing apparatus 10 includes a central processing unit (CPU), storage means such as a read-only memory (ROM), a random-access memory (RAM), a hard disk, drive (HDD), and a solid-state drive (SSD), a user interface including a display unit such as a display and an operation unit such as a liquid crystal panel, communication means that communicates data with other devices, sound input means such as a microphone, and sound output means such as a speaker. The information processing apparatus 10 desirably includes position measuring means having a global positioning system (GPS) function so that a current position thereof can be obtained.

Figure 2:
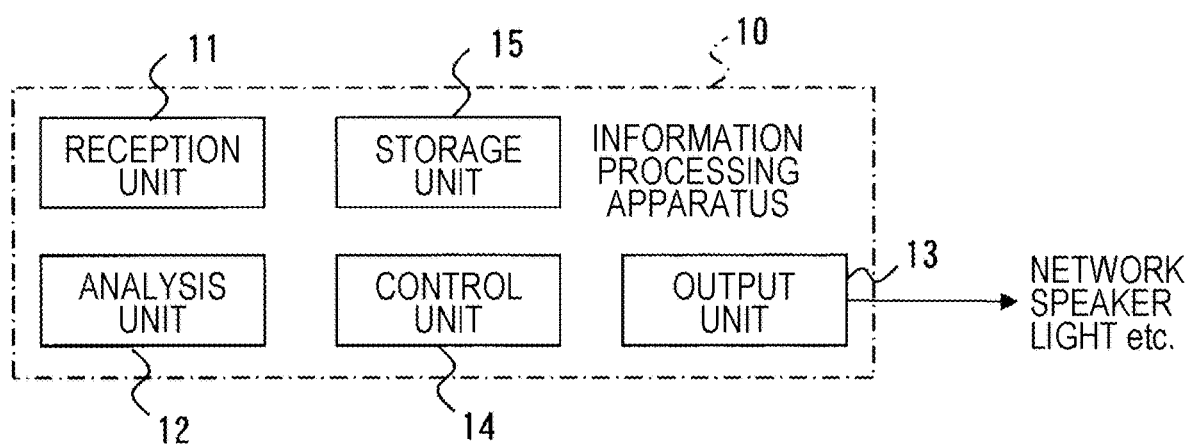
FIG. 2 is a block diagram illustrating the configuration of the mobile terminal according to an exemplary embodiment.

FIG. 2 is a block diagram illustrating the configuration of the information processing apparatus 10 illustrated in FIG. 1. The information processing apparatus 10 includes a reception unit 11, an analysis unit 12, an output unit 13, a control unit 14, and a storage unit 15. Components of the information processing apparatus 10 that are not described are omitted in FIG. 2. The reception unit 11 receives an utterance, that is, words uttered by the user. The analysis unit 12 analyzes an utterance received by the reception unit 11 to identify a conversation partner. The analysis unit 12 also recognizes the user's intention (meaning) expressed in the utterance. The output unit 13 outputs data or the like in order to convey the user's intention to a target or achieve the user's intention. The control unit 14 controls the operation of the reception unit 11, the analysis unit 12, and the output unit 13.

The control unit 14 also determines communication means for conveying the user's intention or achieving means for achieving the user's intention in accordance with a conversation partner and the user's intention recognized by the analysis unit 12. The storage unit 15 stores information to be referred to by the control unit 14 when the control unit 14 determines communication means or achieving means.

FIG. 3 is a table illustrating target-related information set in the storage unit 15. The target-related information is information set by the user in advance for relevant items. In other words, a target with which the user desires to have a conversation is selected as a conversation partner, and item data relevant to the selected target is set in the target-related information.

In the target-related information, "conversation partner", "positional relationship with user", "surrounding environment", "communication means", "device language", "conversation goal", and "achieving means" are associated with one another. The items other than "conversation partner" and "communication means" are optional items. For "conversation partner", a target with which the user has a conversation is set. For "positional relationship with user", information indicating a positional relationship between the user and the conversation partner is set. For "surrounding environment", a surrounding environment of the conversation partner is set. For "communication means", communication means used to convey the user's intention to the conversation partner is set. For "device language", a language used to communicate with the conversation partner is set when the conversation partner is a device capable of processing electronic information (data signals, control signals, etc.). For "conversation goal", the user's intention corresponding to the user's desire, such as an instruction to the conversation partner to perform a certain operation or process, is set. For "achieving means", achieving means for achieving the conversation goal is set. As illustrated in FIG. 3, a plurality of pieces of target-related information (records) may be set for each target. Although types of target are set in FIG. 3 like "PC" and "car", target-related information may be set for individual targets. In this case, target identification information is added to the target-related information (records). For example, the target-related information (records) may be set for individual PCs by setting information for identifying the individual PCs, such as Internet protocol (IP) addresses, in the target-related information.

In the target-related information illustrated in FIG. 3, subjective words such as "close" and "quiet" are set as examples of item data. Item data for "positional relationship with user", for example, are represented as "close" and "far". In order to determine a positional relationship between the user and a target indicated by such subjective words, positions of the user and the target need to be identified first. If the position of the target specified by the user as a conversation partner is fixed, the position is obtained from a certain database or the like. If the target includes position measuring means such as a GPS, a position measured by the position measuring means is obtained from the target. Alternatively, positional information regarding the target is obtained from position detection means that detects the positional information. If a target specified by the user as a conversation partner is movable and includes position measuring means such as a GPS, on the other hand, a position measured by the position measuring means is obtained from the target. Alternatively, positional information regarding the target is obtained from position detection means that detects the positional information. Communication means might be thus necessary in order for the information processing apparatus 10 to obtain positional information regarding the target. The information processing apparatus 10 identifies a current position thereof in the same manner as in the case of the target.

Whether a target is located relatively close to the user may be determined in accordance with a predetermined condition. A positional relationship (distance) between the user and a target and a certain threshold, for example, may be compared. The certain threshold may be set for each type of target or each target. When a target communicates through a network, a communicable range is limited depending on a communication standard and a use mode. Whether the target is located relatively close to the user may be determined, therefore, in consideration of the communicable range.

The same basically holds for "surrounding environment". With respect to a surrounding audio environment, for example, sound volume measuring means (a sound sensor) such as a noise meter may be provided near a target. Whether the surrounding audio environment is "quiet", "noisy", or "normal" may be determined by comparing a sound volume measured by the sound volume measuring means and a certain threshold. With respect to brightness such as "dark", too, illuminance measuring means (light sensor) may measure an illuminance to determine brightness.

When a network is used as communication means, a communication interface for performing network communication according to a communication standard needs to be prepared for the information processing apparatus 10. In addition, depending on the communication standard employed, information (address information, identification information (a service set identifier (SSID) or an encryption key), etc.) for identifying a device with which the information processing apparatus 10 communicates or a device that relays the communication is necessary. It is assumed here that the information processing apparatus 10 has obtained information that enables communication with a device set by the user in the target-related information or is capable of obtaining the information.

The reception unit 11, the analysis unit 12, the output unit 13, and the control unit 14 included in the information processing apparatus 10 are achieved when a computer that constitutes the information processing apparatus 10 and a program that operates on the CPU included in the computer operate in combination with each other. The storage unit 15 is achieved by the HDD included in the information processing apparatus 10. Alternatively, the RAM may be used, or an external storage unit may be used through a network.

The program used in the present exemplary embodiment may be provided through communication means or may be stored in a computer readable medium such as a compact disc read-only memory (CD-ROM) or a universal serial bus (USB) memory and provided. The program provided using the communication means or the computer readable medium is installed on the computer, and the CPU of the computer executes the program to achieve various processes.

Figure 4:
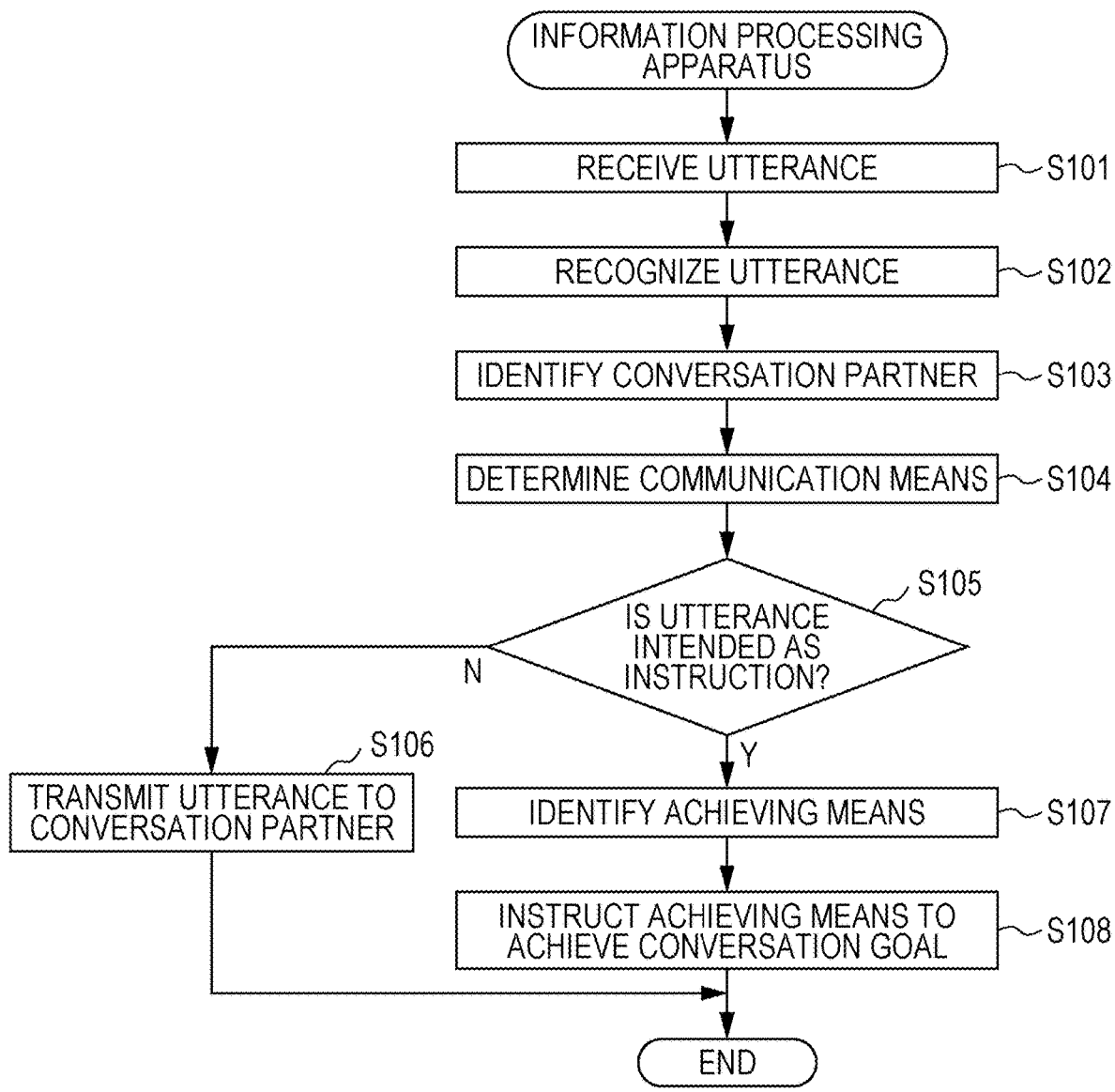
FIG. 4 is a flowchart illustrating a process performed by the information processing apparatus according to the exemplary embodiment.

Next, the operation of the information processing apparatus 10 according to the present exemplary embodiment will be described with reference to a flowchart of FIG. 4.

The user inputs his/her intention (utterance) to the information processing apparatus 10 as a speech sound, and the reception unit 11 receives the utterance collected by the microphone (step S101). Although an utterance is input as a speech sound in the present exemplary embodiment, a speech sound need not necessarily be used. For example, the reception unit 11 may receive information input as written letters, instead.

After the reception unit 11 receives the utterance, the analysis unit 12 recognizes the utterance by performing speech recognition and a semantic analysis (step S102). The reception unit 11 then identifies a conversation partner from the received utterance (step S103). If, as a result of the analysis of the utterance, the utterance includes a word with which a conversation partner (target) can be identified, such as "robot" or "bird", for example, the conversation partner can be identified from the utterance.

If the utterance does not include a word with which the conversation partner can be identified but includes a word "copy", for example, device having copy function, such as an MFP, may be identified as the conversation partner.

If there are a plurality of MFPs around the user, a nearest MFP may be identified as the conversation partner. In this case, positional information regarding the MFPs and the user needs to be obtained. The analysis unit 12 may obtain the positional information regarding the MFPs by accessing a database owned by a facility in which the MFPs are installed or by communicating with the MFPs.

If the information processing apparatus 10 includes an imaging unit such as a camera, the user may capture an image of a target using the imaging unit. In this case, the analysis unit 12 identifies the target as the conversation partner by analyzing image data.

If the user utters a word "this" to indicate the conversation partner, the analysis unit 12 may analyze image data and identify a target close to the user as the conversation partner. Similarly, if the user utters a word "that" to indicate the conversation partner, the analysis unit 12 may identify a target far from the user as the conversation partner.

If a camera is provided where the user is located and an imaging range of the camera includes the user and a target as the conversation partner, the user may turn his/her face to or looks at the conversation partner. The analysis unit 12 analyzes a direction in which the user faces in image data obtained by the camera and identifies the conversation partner.

As described above as an example, the analysis unit 12 identifies the conversation partner from information obtained from the user who has uttered words, that is, an utterance (a speech sound uttered by the user) received by the reception unit 11, or from the user's motion such as the movement of the user's face or line of sight. Although some patterns for identifying the conversation partner have been described in the present exemplary embodiment, the conversation partner may be identified from a combination of some of these patterns, instead.

Next, the control unit 14 determines, on the basis of the recognized utterance, communication means for transmitting a meaning of the utterance (step S104). In the present exemplary embodiment, the communication means is determined on the basis of the target-related information set in the storage unit 15 in advance. If the utterance is not intended as an instruction to a target to perform a certain operation or process (N in step S105), that is, if the meaning of the utterance is simply transmitted to the conversation partner, the control unit 14 determines the communication means as follows (step S106).

If the conversation partner has been identified as an MFP, for example, the MFP is associated with network communication (Wi-Fi (registered trademark)) in the target-related information as communication means. The control unit 14, therefore, identifies the communication means for the MFP as network communication (Wi-Fi). As a result, the output unit 13 transmits the meaning of the utterance to the MFP through a network according to a Wi-Fi communication standard in accordance with an instruction from the control unit 14.

If the conversation partner has been identified as a robot, the robot is associated with network communication (Bluetooth (registered trademark) low energy (BLE)) and network communication (Wi-Fi) in the target-related information as communication means. If there are a plurality of pieces of information (records) for one target, the control unit 14 checks a positional relationship with the identified robot and determines the communication means in accordance with a distance between the user and the robot. More specifically, if the user and the robot are relatively close to each other, network communication (BLE) is determined as the communication means for the robot. Whether the user and the robot are relatively close to each other may be determined in accordance with the predetermined condition as described above. As a result, the output unit 13 transmits the meaning of the utterance to the robot through a network according to a BLE communication standard in accordance with an instruction from the control unit 14. If the user and the robot are relatively far from each other, on the other hand, network communication (Wi-Fi) is determined as the communication means for the robot. As a result, the output unit 13 transmits the meaning of the utterance to the robot through a network according to a Wi-Fi communication standard in accordance with an instruction from the control unit 14.

If the conversation partner has been identified as a plant, the plant is associated with a plurality of communication means, namely sound, a speaker, and light, in the target-related information. In this case, the control unit 14 checks a surrounding environment of the plant and determines the communication means in accordance with the surrounding environment of the plant. More specifically, if the surrounding environment of the plant is normal, the control unit 14 determines sound, that is, a speech sound uttered by the user, as the communication means. In this case, the control unit 14 instructs the output unit 13 to display a notification on a display unit of the information processing apparatus 10 or output a sound from the speaker. The user makes the utterance again in response to the output. Alternatively, the output unit 13 may output a speech sound received by the reception unit 11 from the speaker included in the information processing apparatus 10.

If the surrounding environment of the plant is noisy, a speaker is determined as the communication means. In this case, the output unit 13 outputs the utterance from the speaker in accordance with an instruction from the control unit 14. At this time, the output unit 13 outputs the utterance loudly enough to reach the plant even in the noisy environment. Alternatively, if there is a speaker near the plant, the speaker nay output the utterance.

If the surrounding environment is dark, light is determined as the communication means. The output unit 13 turns on (flashes) a light near the plant to transmit the meaning of the utterance. The turning on (flashing), color, and illuminance of a light may be adjusted in accordance with a target to which a meaning of an utterance is to be transmitted.

As described above, in the present exemplary embodiment, the target-related information is referred to, and communication means associated with an identified conversation partner is determined as communication means for transmitting a meaning of an utterance to the conversation partner. The meaning of the utterance is then transmitted to conversation partner using the determined communication means. If a condition for selecting communication means (item data) is set in an item such as a positional relationship between the user and a target or a surrounding environment of a target (an environment in which the target exists) for a conversation partner, communication means that suits the item data is selected.

Although a positional relationship between the user and a target and a surrounding environment of a target (an environment in which the target exists) have been described as conditions for selecting communication means in the present exemplary embodiment, conditions (items) for selecting communication means need not be limited to these examples. For example, communication means may be determined in accordance with a surrounding environment of the user, instead.

Depending on settings of the target-related information, a plurality of selection conditions might be satisfied. If the conversation partner is a plant, for example, a surrounding environment of the plant might be noisy and dark. In addition, even when the surrounding environment of the plant is normal, the plant might be far from the user. If a plurality of records are applicable, priority levels are given to items to be referred to when communication means is determined or records of the same target in order to determine single communication means. Alternatively, a plurality of communication means may be determined for a single conversation partner, and a meaning of an utterance may be transmitted through a plurality of routes.

In contrast to the above description, where the utterance is not intended an instruction to a target to perform a certain operation or process, if the utterance is intended as an instruction (Y in step S105), the control unit 14 determines achieving means for achieving a conversation goal as follows (step S107).

After the conversation partner and the communication means are determined as described above, the control unit 14 obtains a conversation goal (item data) set in the target-related information. The control unit 14 then compares the conversation goal and a result of the semantic analysis of the utterance conducted by the analysis unit 12. If the conversation goal and the result of the semantic analysis match, the control unit 14 obtains achieving means corresponding to the conversation goal from the target-related information. The control unit 14 thus determines the achieving means for achieving a conversation goal.

If the utterance is "Do accounts", the analysis unit 12 identifies the conversation partner as a PC and recognizes a meaning of the utterance. If a conversation goal that matches a result of a semantic analysis conducted by the analysis unit 12 is set in information whose communication means correspond to the PC, the control unit 14 obtains achieving means corresponding to the conversation goal.

After the achieving means is determined, the output unit 13 transmits a type of process to the PC through a wired LAN and instructs a remote application to perform the process in accordance with an instruction from the control unit 14 in order to achieve "Do accounts" (step S108). At this time, the output unit 13 also transmits relevant account data and notifies the PC of a destination address of the account data.

In the present exemplary embodiment, a case where a remote application processes an utterance is assumed. That is, the remote application, which is achieving means, corresponds to software that achieves a conversation goal by performing a process. A case is also possible, however, where an information processing device such as a PC that executes the remote application determined as achieving means has not been given access to another target (hardware) for achieving a conversation goal or access to software. Achieving means, therefore, may be means for instructing another target or software capable of achieving a conversation goal to achieve the conversation goal. In addition, the information processing apparatus 10 might not be given access to achieving means set in the target-related information. In this case, too, the information processing apparatus 10 may instruct a target having access to the achieving means to achieve a conversation goal indirectly using the achieving means.

As described above, in the present exemplary embodiment, a conversation partner is identified from an utterance, and a meaning of the utterance is transmitted to the identified conversation partner using communication means that suits the conversation partner. The user may have a conversation not only with a device capable of processing information but also with an organism such as a plant or an animal by employing communication means that can be interpreted by the organism. If an utterance is intended as an instruction to perform a certain operation or process, achieving means is determined such that a conversation goal is achieved. Although communication means and achieving means are determined on the basis of the target-related information in the present exemplary embodiment, a method for determining communication means and achieving means is not limited to this. If information for identifying communication means and achieving means is stored in a target that is a conversation partner or a storage area relating to the target, for example, the control unit 14 may obtain the information from the target or the storage area and identify the communication means and the achieving means. The information obtained from the storage area dependent on the target is more accurate than settings made by the user in the target-related information.

If the target is a computer or the like and includes a storage unit, the storage area may be a memory. Alternatively, the storage area may be storage means incorporated into a target or an object attached to a target, such as a collar of a pet (target). The information for identifying communication means and achieving means may thus be obtained from the conversation partner. Alternatively, communication means and achieving means may be determined from a past history or a result of learning.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
control a microphone to receive an utterance of a user;
identify a conversation partner of the user, based on the received utterance;
access a stored table that stores information on a plurality of conversation partners, including a first conversation partner that is an electronic apparatus and a second conversation partner that is a non-human organism, and a plurality of communication mediums, and corresponds each conversation partner with a communication medium, the identified conversation partner corresponding to one of the plurality of conversation partners;
select a communication medium to be used from among the plurality of communication mediums for transmitting information based on the received utterance to the identified conversation partner, by referencing the stored table; and
control a communicator to transmit the information based on the received utterance to the identified conversation partner with the selected communication medium,
wherein the information processing apparatus is configured to control the electronic apparatus based on the received utterance, and
the communication medium designated in the stored table for the second conversation partner is sound or light.

2. The information processing apparatus according to claim 1, further comprising:
an achieving unit for achieving a conversation goal in accordance with the conversation partner; and
an instruction unit that instructs the achieving unit to achieve the conversation goal.

3. The information processing apparatus according to claim 1,
wherein the processor is programmed to determine the communication medium according to a positional relationship between the user who has made the utterance and the conversation partner, the positional relationship being identified in the stored table.

4. The information processing apparatus according to claim 1,
wherein the processor is programmed to determine the communication medium according to an environment in which the conversation partner exists, the environment being identified in the stored table.

5. The information processing apparatus according to claim 1,
wherein the processor is programmed to determine the communication medium according to an environment in which the user who has made the utterance exists, the environment being identified in the stored table.

6. The information processing apparatus according to claim 1,
wherein the processor is programmed to obtain preset information and determine the communication medium on a basis of the obtained preset information.

7. The information processing apparatus according to claim 6,
wherein the processor is programmed to obtain the preset information from the conversation partner.

8. The information processing apparatus according to claim 1,
wherein the processor is programmed to identify the conversation partner on a basis of the user's motion and the user's speech sound.

9. The information processing apparatus according to claim 1, further comprising an achieving unit for achieving a conversation goal in accordance with the conversation partner,
wherein the achieving unit is software that processes the utterance or a unit that issues an instruction to achieve the conversation goal.

10. A non-transitory computer readable medium storing a program causing a computer to execute a process, the process comprising:
- controlling a microphone to receive an utterance of a user;
- identifying a conversation partner of the user based on the received utterance;
- accessing a stored table that stores information on a plurality of conversation partners, including a first conversation partner that is an electronic apparatus and a second conversation partner that is a non-human organism, and a plurality of communication mediums, and corresponds each conversation partner with a communication medium, the identified conversation partner corresponding to one of the plurality of conversation partners;
- selecting a communication medium to be used from among the plurality of communication mediums for transmitting information based on the received utterance to the identified conversation partner, by referencing the stored table; and
- controlling a communicator to transmit the information based on the received utterance to the identified conversation partner with the selected communication medium,
- wherein the computer controls the electronic apparatus based on the received utterance, and
- the communication medium designated in the stored table for the second conversation partner is sound or light.

11. An information processing apparatus comprising:
- reception means for controlling a microphone to receive an utterance of a user;
- identification means for identifying a conversation partner of the user based on the received utterance;
- access means for accessing a stored table that stores information on a plurality of conversation partners, including a first conversation partner that is an electronic apparatus and a second conversation partner that is a non-human organism, and a plurality of communication mediums, and corresponds each conversation partner with a communication medium, the identified conversation partner corresponding to one of the plurality of conversation partners;
- selection means for selecting a communication medium to be used from among the plurality of communication mediums for transmitting information based on the received utterance to the identified conversation partner, by referencing the stored table; and
- control means for controlling a communicator to transmit the information based on the received utterance to the identified conversation partner with the selected communication medium,
- wherein the information processing apparatus is configured to control the electronic apparatus based on the received utterance, and
- the communication medium designated in the stored table for the second conversation partner is sound or light.

* * * * *